United States Patent
Barclay et al.

(10) Patent No.: US 7,336,776 B2
(45) Date of Patent: Feb. 26, 2008

(54) METHOD OF ESTABLISHING A MULTI-USER CALL IN A COMMUNICATION SYSTEM

(75) Inventors: Deborah Lewandowski Barclay, Winfield, IL (US); Christopher Lawrence Fernandez, Aurora, IL (US); Ronald Bruce Martin, Carol Stream, IL (US); Raymond Leroy Ruggerio, Glenview, IL (US); Donna Michaels Sand, Redmond, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 960 days.

(21) Appl. No.: 10/745,420

(22) Filed: Dec. 22, 2003

(65) Prior Publication Data

US 2005/0135281 A1    Jun. 23, 2005

(51) Int. Cl.
*H04M 3/42* (2006.01)
(52) U.S. Cl. .................. 379/204.01; 455/518; 455/519
(58) Field of Classification Search ............ 379/204.01
See application file for complete search history.

(56) References Cited

U.S. PATENT DOCUMENTS

| 6,330,022 | B1 * | 12/2001 | Seligmann ............... 348/14.08 |
| 6,404,885 | B1 * | 6/2002 | Field et al. ............ 379/266.04 |
| 6,754,323 | B1 * | 6/2004 | Chang et al. .......... 379/205.01 |
| 7,075,929 | B2 * | 7/2006 | Korus et al. ................. 370/390 |
| 2004/0024711 | A1 * | 2/2004 | Camping et al. ............. 705/64 |
| 2004/0042438 | A1 * | 3/2004 | Jiang et al. ................. 370/342 |
| 2004/0132484 | A1 * | 7/2004 | Murakami ............... 455/550.1 |

\* cited by examiner

*Primary Examiner*—Creighton Smith
(74) *Attorney, Agent, or Firm*—John B. MacIntyre

(57) ABSTRACT

The present invention provides a method for establishing a multi-user call in a communication system. The communication system receives a call request to establish a group call with a shared group of users. The communication system determines which of the plurality of individual users should be excluded from the call and connects each of the group of included users to establish a multi-user call. The communication system preferably indicates that a unit was not currently available, for example by playing a prerecorded message, playing a tone and also preferably indicates why a unit was not available.

20 Claims, 2 Drawing Sheets

METHOD OF ESTABLISHING A MULTI-USER CALL IN A COMMUNICATION SYSTEM

FIELD OF THE INVENTION

The present invention relates generally to communication systems, and more particularly to a method of connecting a plurality of users in a communication system.

BACKGROUND OF THE INVENTION

Communication systems allow calls to be established between users. Three-way calling allows three users to be connected in a single call.

When a large group of users wants to communicate on a single call, a conference call can be established. A typical conference call utilizes a conference bridge that each party dials in to, enters the conference code, and is then bridged onto the conference call.

One problem with conference bridges is that the conference bridge needs to be established in advance. Information such as the number of ports required, the date, the time the conference bridge should be established, and the length of the conference call need to be sent to the conference bridging system.

Further, each of the participants in the conference call needs to dial into the conferencing system in order to participate in the call. The users must all remember to dial in to the conferencing system, and must also know the conference code in order to be connected with the desired conference call.

As can be seen, the present mode of establishing calls between multiple users in a communication system is time-consuming and inefficient. Therefore, a need exists for a method that allows multiple users to be connected on a multi-user call without requiring extensive setup prior to the call.

BRIEF SUMMARY OF THE INVENTION

The present invention provides a method for establishing a multi-user call in a communication system. The communication system receives a call request to establish a group call with a shared group of users. The shared group of users can be wireline users, wireless users, or both. The call request can be initiated utilizing a feature code for the group call service and typically includes the group number of the group being called.

The communication system determines which of the plurality of individual users should be excluded from the call. Members of the group can be excluded from the call based upon the time of day, the day of the week, or the location of the user. In certain instances, such as emergency calls or calls having a predetermined session priority, the communication system can override the exclusion and include the excluded user in the group call.

The communication system connects each of the group of included users together to establish a multi-user call. The communication system preferably connects the group of included users by requesting and receiving a dynamically-allocated conference bridge with enough ports to support the group call.

The communication system determines whether each of the group of included users is currently available. If a user is not available, the communication system drops the line to a user who is not currently available. The communication system preferably indicates that a unit was not currently available, for example by playing a prerecorded message, playing a tone, or the like. In addition, the communication system preferably indicates why a unit was not available. The reasons can include a communication unit being busy, not answering the call request, or not able to be located.

When the group call is ended, the communication system tears down the multi-user call. The group call can be considered ended when the initiator disconnects from the call or when the last member of the group call hangs up or disconnects from the call.

DETAILED DESCRIPTION OF THE INVENTION

Figure 1:
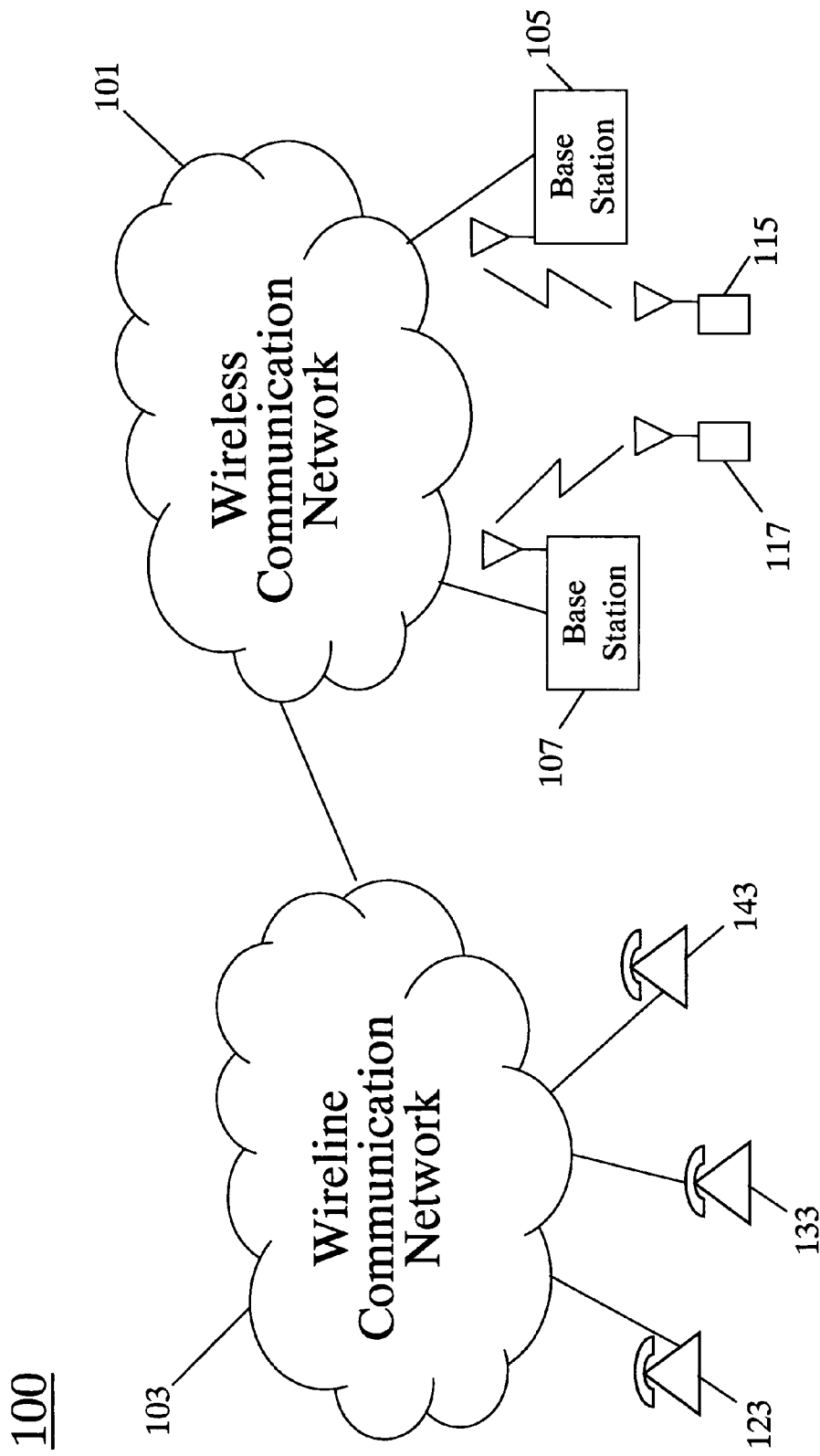
FIG. 1 depicts a communication system including a wireline and wireless communication network in accordance with an exemplary embodiment of the present invention.
Figure 2:
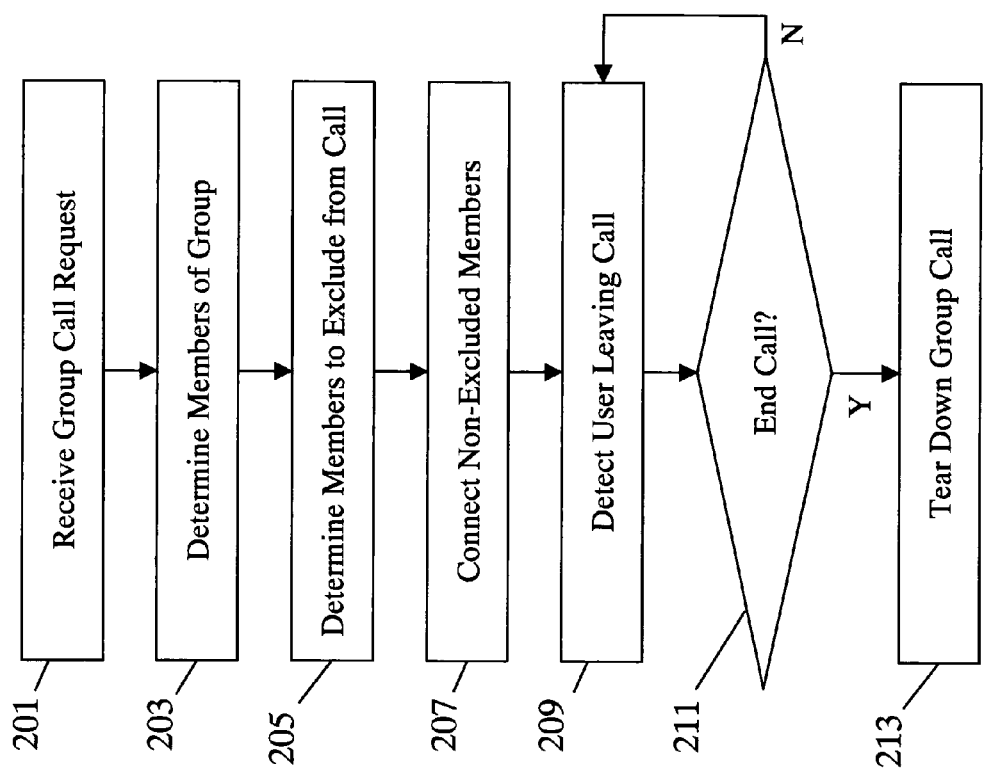
FIG. 2 depicts a flow chart of a method for establishing a multi-user call in a communication system in accordance with an exemplary embodiment of the present invention.

The present invention can be better understood with reference to FIGS. 1 and 2. FIG. 1 depicts a communication system 100 that includes a wireless communication network 101 and a wireline communication network 103 in accordance with an exemplary embodiment of the present invention.

Wireless communication network 101 includes a plurality of base stations, only two of which, base station 105 and base station 107, are shown for clarity. Wireless communication network 101 also includes a plurality of wireless communication units, only two of which, wireless communication unit 115 and wireless communication unit 117, are shown for clarity. Wireless communication unit 115 is depicted as being in wireless communication with base station 105, and wireless communication unit 117 is depicted as being in wireless communication with base station 107.

Wireline communication network 103 is preferably a public switched telephone network (PSTN). Wireline communication network 103 provides communication to a plurality of wireline users, only three of which, wireline communication units 123, 133, and 143, are depicted for clarity.

In accordance with an exemplary embodiment of the present invention, wireline communication unit 123, wireline communication unit 133, wireless communication unit 115, and wireless communication unit 117 are members of a shared group. For example, the shared group could be the members of a family, friends, co-workers, or any other group that may wish to establish a communication with the members of the group at certain times.

In an exemplary embodiment of the present invention, a member of the shared group decides to place a call to all members of the shared group. The user, in this example wireline communication unit 123, desires to establish a call with other members of the shared group. Wireline communication unit 123 dials a number associated with the shared group, and the communication system determines which communication units are members of the group. The communication system also determines which members of the shared group should be excluded from this group call. If the shared group is a work group, a member of the group may be excluded due to the time of day or the day of the week.

If the shared group is a family group, a member may be excluded from a particular call based upon the user's location, utilizing global positioning technology or other location-determining technology. These are just a few examples of uses of an exemplary embodiment of the present invention.

FIG. 2 depicts a flow chart 200 of a method for establishing a multi-user call in a communication system in accordance with an exemplary embodiment of the present invention.

Communication system receives (201) a group call request. The call request is a request for a call associated with a shared group comprising a plurality of individual users. The call request is a request for a dynamically allocated conference bridge with enough ports to support each member of the shared group.

The call request can come from a member of the shared group or a non-member of the shared group. In one exemplary embodiment, the group call request is initiated utilizing special digits, also known as a feature code, such as #G. In a further exemplary embodiment, the group call request includes a group number associated with the shared group. In an exemplary embodiment, the group call is placed utilizing #G+GROUP_NUMBER. In a further exemplary embodiment, a short-cut key is defined that makes a group call request to the requester's own shared group without having to enter the group number.

The communication system determines (203) the members of the group from the group call request. The communication system preferably parses the group identifier from the group call request and accesses a database to determine the members registered to the specified shared group. The members can be wireline users, wireless users, or a combination of the two.

The communication system determines (205) the members of the group that should be excluded from the call. The group of users that is produced after exclusion is referred to as the group of included users. Users who are members of the group can be excluded, for example, based upon the time of day. For example, certain members may be included during business hours and excluded during non-business hours; while different users may be included in group calls that occur during evening hours but excluded during business hours. In a further exemplary embodiment, users are excluded from a call based upon the day of the week. For example, if a member of the group is always out of town on weekends, he could be excluded from any calls that occur on Saturday or Sunday. In a further exemplary embodiment, users can be excluded based upon the location of the user.

It should be understood that these exclusion factors can be combined. For example, certain users may be excluded on weekends during evening hours.

In an exemplary embodiment of the present invention, the step of excluding a member of the group can be overridden, for example based upon the session priority of the call request.

Communication system connects (207) the non-excluded members of the group to establish a multi-user call. In an exemplary embodiment of the present invention, the communication system requests a dynamically-allocated conference bridge with enough ports to support the plurality of individual users. This can be accomplished by dialing each of the plurality of individual users.

The communication system determines which of the users are available and responded to the call request, and connects these group users. The lines to users who are not currently available are dropped. In an exemplary embodiment of the present invention, if the call request to a member of the group is forwarded to a voice mail system, the line to this user is dropped.

If the initiator of the group call was on a first group call and then initiated a second group call utilizing the three-way calling feature, the first group call is conferenced into the second group call.

In an exemplary embodiment of the present invention, the communication system indicates to connected users of the shared group that a communication unit of the shared group was not currently available. This can be accomplished by playing a prerecorded message or by playing a tone, and is preferably accompanied by a reason why a unit was not available. The reason a unit was not available may include that the unit was busy, indicating that the unit did not answer the call request, or indicating that the unit was not able to be located.

As the call progresses, the communication system will detect (209) that a user has left the call. A user can leave a call by hanging up, losing power, or roaming out of a coverage area.

The communication system determines (211) if the group call should be ended due to a user leaving the call. If not, the communication system returns to step 209 to detect a further user leaving the call.

In an exemplary embodiment of the present invention, the step of determining that the group call should be ended is triggered by the initiator of the group call hanging up. In a further exemplary embodiment, the step of determining that the group call should be ended is triggered by the last remaining party of the group call hanging up.

If the communication system determines in step 211 that the group call should be ended, the communication system tears down (213) the multi-user call and returns all resources to their respective communication networks.

The present invention thereby provides a method for establishing a multi-user call in a communication system. The present invention allows multiple users to be connected on a multi-user call without requiring extensive setup by a user prior to the call.

While this invention has been described in terms of certain examples thereof, it is not intended that it be limited to the above description, but rather only to the extent set forth in the claims that follow.

We claim:

1. A method for establishing a multi-user call in a communication system, the method comprising:
   receiving a call request, the call request being a request associated with a shared group comprising a plurality of individual users;
   determining which of the plurality of individual users should be excluded from the call, thereby producing a group of included users and a group of excluded users; and
   connecting each of the group of included users together to establish a multi-user call.

2. A method for establishing a multi-user call in a communication system in accordance with claim 1, wherein the step of receiving a call request comprises receiving a call request that is initiated utilizing special digits.

3. A method for establishing a multi-user call in a communication system in accordance with claim 1, wherein the step of receiving a call request comprises receiving a call request that includes a group number associated with the shared group.

4. A method for establishing a multi-user call in a communication system in accordance with claim 1, wherein the step of connecting each of the group of included users together comprises requesting a dynamically-allocated conference bridge with enough ports to support the group of included users.

5. A method for establishing a multi-user call in a communication system in accordance with claim 4, wherein the step of connecting each of the group of included users together comprises a bridging network dialing each of the group of included users.

6. A method for establishing a multi-user call in a communication system in accordance with claim 1, the method further comprising the step of determining whether each of the group of included users is currently available.

7. A method for establishing a multi-user call in a communication system in accordance with claim 6, the method further comprising the step of indicating that a unit was not currently available.

8. A method for establishing a multi-user call in a communication system in accordance with claim 7, wherein the step of indicating that a unit was not currently available comprises playing a prerecorded message.

9. A method for establishing a multi-user call in a communication system in accordance with claim 7, wherein the step of indicating that a unit was not currently available comprises playing a tone.

10. A method for establishing a multi-user call in a communication system in accordance with claim 7, wherein the step of indicating that a unit was not currently available comprises indicating a reason why a unit was not available.

11. A method for establishing a multi-user call in a communication system in accordance with claim 10, wherein the step of indicating a reason why a unit was not available comprises indicating that the unit was busy.

12. A method for establishing a multi-user call in a communication system in accordance with claim 10, wherein the step of indicating a reason why a unit was not available comprises indicating that the unit did not answer the call request.

13. A method for establishing a multi-user call in a communication system in accordance with claim 10, wherein the step of indicating a reason why a unit was not available comprises indicating that the unit was not able to be located.

14. A method for establishing a multi-user call in a communication system in accordance with claim 1, the method further comprising the step of tearing down the multi-user call.

15. A method for establishing a multi-user call in a communication system in accordance with claim 14, wherein the call request is from an initiator, and wherein the step of tearing down the multi-user call is triggered by the initiator hanging up.

16. A method for establishing a multi-user call in a communication system in accordance with claim 14, wherein the step of tearing down the multi-user call is triggered by the last member of the call hanging up.

17. A method for establishing a multi-user call in a communication system in accordance with claim 1, wherein the step of determining which of the plurality of individual users should be excluded from the call comprises determining which of the plurality of individual users should be excluded from the call based upon the time of day.

18. A method for establishing a multi-user call in a communication system in accordance with claim 1, wherein the step of determining which of the plurality of individual users should be excluded from the call comprises determining which of the plurality of individual users should be excluded from the call based upon the day of the week.

19. A method for establishing a multi-user call in a communication system in accordance with claim 1, wherein the step of determining which of the plurality of individual users should be excluded from the call comprises determining which of the plurality of individual users should be excluded from the call based upon the location of the user.

20. A method for establishing a multi-user call in a communication system in accordance with claim 1, the method further comprising the step of overriding the exclusion.

* * * * *